US011166263B2

(12) United States Patent
Zhang et al.

(10) Patent No.: US 11,166,263 B2
(45) Date of Patent: Nov. 2, 2021

(54) SELECTIVE REALLOCATION OF PREVIOUSLY ALLOCATED RADIO RESOURCES

(71) Applicant: Telefonaktiebolaget LM Ericsson (publ), Stockholm (SE)

(72) Inventors: Hanzhi Zhang, Munich (DE); Ying Sun, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 483 days.

(21) Appl. No.: 15/580,454

(22) PCT Filed: Jun. 11, 2015

(86) PCT No.: PCT/EP2015/063054
§ 371 (c)(1),
(2) Date: Dec. 7, 2017

(87) PCT Pub. No.: WO2016/198110
PCT Pub. Date: Dec. 15, 2016

(65) Prior Publication Data
US 2018/0167916 A1   Jun. 14, 2018

(51) Int. Cl.
*H04W 72/04* (2009.01)
*H04W 72/12* (2009.01)

(52) U.S. Cl.
CPC ..... *H04W 72/042* (2013.01); *H04W 72/1268* (2013.01); *H04W 72/1284* (2013.01)

(58) Field of Classification Search
CPC .................................................. H04W 72/042
See application file for complete search history.

(56) References Cited

U.S. PATENT DOCUMENTS

2010/0046451 A1* 2/2010 Tada ..................... H04W 4/10
370/329
2010/0220683 A1* 9/2010 Novak ................. H04L 5/0044
370/330

(Continued)

FOREIGN PATENT DOCUMENTS

WO      2009022855 A2    2/2009

OTHER PUBLICATIONS

Motorola, "Persistent Scheduling for E-UTRA VoIP and Control Channel considerations", 3GPP RAN WG1 #46bis, Oct. 9-13, 2006, pp. 1-16, Seoul, Korea, R1-062981.

(Continued)

*Primary Examiner* — Robert C Scheibel
(74) *Attorney, Agent, or Firm* — Sage Patent Group

(57) ABSTRACT

An access node (100) of a cellular network sends an uplink grant to a communication device (10-A, 10-B, 10-C). The uplink grant indicates uplink radio resources allocated to the communication device (10-A, 10-B, 10-C) in reoccurring time intervals. The access node (100) monitors a uplink radio resource, configured before each of the reoccurring time intervals, for an indication of intention to transmit uplink data by an uplink transmission on the indicated uplink radio resources in the corresponding reoccurring time interval. In response to not detecting the indication and determining a need for an uplink transmission in the corresponding reoccurring time interval by a further communication device (10-A, 10-B, 10-C), the access node (100) reallocates the indicated uplink radio resources in the corresponding time interval to the further communication device.

20 Claims, 11 Drawing Sheets

(56) References Cited

U.S. PATENT DOCUMENTS

| 2011/0194502 A1* | 8/2011 | Sung | H04L 12/66 |
| | | | 370/329 |
| 2014/0031052 A1* | 1/2014 | Lagerqvist | H04W 72/10 |
| | | | 455/452.1 |
| 2015/0098341 A1 | 4/2015 | Ramkumar et al. | |

OTHER PUBLICATIONS

LG Electronics, Inc., "Uplink scheduling for VoIP", 3GPP TSG Ran WG2 #56, Nov. 6-10, 2006, pp. 1-4, Riga, Latvia, R2-063273.
NTT Docomo, Inc., "Uplink resource allocation scheme", 3GPP TSG RAN WG2 #54, Aug. 18-Sep. 1, 2006, pp. 1-6, Tallinn, Estonia, R2-062164.

\* cited by examiner

SELECTIVE REALLOCATION OF PREVIOUSLY ALLOCATED RADIO RESOURCES

TECHNICAL FIELD

The present invention relates to methods for controlling radio transmission in a cellular network and to corresponding devices.

BACKGROUND

In cellular networks, allocation of radio resources to a certain user equipment (UE), also referred to as scheduling, is typically accomplished dynamically on the network side. In the downlink (DL) direction from the cellular network to the UE, a network node may allocate radio resources in accordance with a need to transmit DL data to the UE. The network node may then inform the UE about the allocated resources by sending a DL assignment. For the uplink (UL) direction from the UE to the cellular network, a scheduling request which is sent by the UE to the cellular network may be used to indicate that the UE needs radio resources for sending UL data. For example, in the LTE (Long Term Evolution) radio access technology specified by 3GPP ($3^{rd}$ Generation Partnership Project), a base station of the LTE radio access technology, referred to as "evolved Node B" (eNB) is responsible for the scheduling. This may be accomplished dynamically, taking into account the instantaneous traffic pattern and radio propagation characteristics of each UE.

In the dynamic scheduling process of the LTE radio access technology a UE which needs to send UL data may first send a scheduling request to an eNB which serves the cell of the UE. The scheduling request may be sent on a UL control channel, referred to as PUCCH (Physical UL Control Channel), providing dedicated resources for sending scheduling requests by the UE. Alternatively, the scheduling request may be sent on a contention based random access channel (RACH). The eNB then allocates UL radio resources to the UE. The allocated UL radio resources are indicated in a UL grant, which is sent from the eNB to the UE. A separate UL grant is sent for each subframe or TTI (Transmission Time Interval) of 1 ms. On the allocated UL radio resources, the UE may then send UL data to the eNB. In addition, the UE may also send a buffer status report (BSR) indicating the amount of buffered UL data still to be sent by the UE.

In the above process of transmitting the UL data, latency occurs which is due to the sending of the scheduling request before the UE can proceed with the transmission of the UL data. However, such delay is not desirable in many cases. For example, certain data traffic may be sensitive to latency, such as data traffic associated with online gaming.

Latency is relevant not only to the perceived responsiveness of the system, but may also have an impact on data throughput. An important example of such a scenario is Internet data traffic based on HTTP (Hypertext Transfer Protocol)/TCP (Transport Control Protocol). Typical transferred data volumes associated with HTTP/TCP based transactions are in the range from a few ten kilobytes up to one megabyte. In this range of data volumes, a time interval referred to as TCP slow start period constitutes a significant part of the transaction. During the TCP slow start period, the achievable throughput is limited by latency. Hence, improved latency can help to improve the throughput of typical HTTP/TCP based Internet traffic. Similar considerations may apply or other kinds of TCP based data traffic.

A technology which may be used for achieving a reduced latency is Semi-Persistent Scheduling (SPS) as specified in 3GPP TS 36.321 V12.5.0 (2015-03). In SPS, UL radio resources are periodically allocated to the UE by sending a long lasting grant which covers multiple TTIs by allocating UL radio resources in a pattern of TTIs with configurable periodicity. By utilizing SPS, the need to send scheduling requests may be reduced and latency associated with the need to send a scheduling request may be avoided.

However, the utilization of such long lasting grants may result in an inefficient utilization of the UL radio resources. Specifically, it may occur that UL radio resources are allocated to the UE, but the UE has no UL data to transmit, i.e., the UE is over-allocated with UL radio resources. Such over-allocated UL radio resources would not be available for other purposes and thus wasted. Achieving a reasonable trade-off between reduced latency by utilization of long lasting grants and efficiency of radio resource utilization by limiting over-allocation as far as possible is a complex task and typically requires prediction of the UE's future need to perform UL transmissions.

Accordingly, there is a need for techniques which allow for efficiently controlling radio transmissions in a cellular network, in particular with respect to UL radio resources allocated by a long lasting grant.

SUMMARY

According to an embodiment of the invention, a method of controlling radio transmission in a cellular network is provided. According to the method, an access node of the cellular network sends a UL grant to a communication device. The UL grant indicates UL radio resources allocated to the communication device in reoccurring time intervals. The access node monitors a UL radio resource, configured before each of the reoccurring time intervals, for an indication of intention to transmit UL data by an uplink transmission on the indicated UL radio resources in the corresponding reoccurring time interval. In response to not detecting the indication and determining a need for an UL transmission in the corresponding reoccurring time interval by a further communication device, the access node reallocates the indicated UL radio resources in the corresponding time interval to the further communication device.

According to a further embodiment of the invention, a method of controlling radio transmission in a cellular network is provided. According to the method, a communication device receives an UL grant from the cellular network. The UL grant indicates UL radio resources allocated to the communication device in reoccurring time intervals. In a UL radio resource configured before each of the reoccurring time intervals, the communication device sends an indication of intention to transmit UL data by an uplink transmission on the indicated UL radio resources in the corresponding reoccurring time interval. After sending the indication, the communication device performs the UL transmission on the indicated UL radio resources in the corresponding reoccurring time interval.

According to a further embodiment of the invention, an access node for a cellular network is provided. The access node comprises an interface for connecting to a communication device. Further, the node comprises at least one processor. The at least one processor is configured to send a UL grant to the communication device. The UL grant indicates UL radio resources allocated to the communication device in reoccurring time intervals. Further, the at least one processor is configured to monitor a UL radio resource, configured before each of the reoccurring time intervals, for an indication of intention to transmit UL data by an UL transmission on the indicated UL radio resources in the corresponding reoccurring time interval. Further, the at least one processor is configured to, in response to not detecting the indication and determining a need for an UL transmission in the corresponding reoccurring time interval by a further communication device, reallocate the indicated UL radio resources in the corresponding reoccurring time interval to the further communication device.

According to a further embodiment of the invention, a communication device is provided. The communication device comprises an interface for connecting to a cellular network. Further, the communication device comprises at least one processor. The at least one processor is configured to receive a UL grant from the cellular network. The UL grant indicates UL radio resources allocated to the communication device in reoccurring time intervals. Further, the at least one processor is configured to send, in a UL radio resource configured before each of the reoccurring time intervals, an indication of intention to transmit UL data by an UL transmission on the indicated UL radio resources in the corresponding reoccurring time interval. Further, the at least one processor is configured to, after sending the indication, perform the UL transmission on the indicated UL radio resources in the corresponding reoccurring time interval.

According to a further embodiment of the invention, a computer program or computer program product is provided, e.g., in the form of a non-transitory storage medium, which comprises program code to be executed by at least one processor of an access node of a cellular network. Execution of the program code causes the at least one processor to send a UL grant to the communication device. The UL grant indicates UL radio resources allocated to the communication device in reoccurring time intervals. Further, execution of the program code causes the at least one processor to monitor a UL radio resource, configured before each of the reoccurring time intervals, for an indication of intention to transmit UL data by an UL transmission on the indicated UL radio resources in the corresponding reoccurring time interval. Further, execution of the program code causes the at least one processor to, in response to not detecting the indication and determining a need for an UL transmission in the corresponding reoccurring time interval by a further communication device, reallocate the indicated UL radio resources in the corresponding reoccurring time interval to the further communication device.

According to a further embodiment of the invention, a computer program or computer program product is provided, e.g., in the form of a non-transitory storage medium, which comprises program code to be executed by at least one processor of a communication device. Execution of the program code causes the at least one processor to receive a UL grant from the cellular network. The UL grant indicates UL radio resources allocated to the communication device in reoccurring time intervals. Further, execution of the program code causes the at least one processor to send, in a UL radio resource configured before each of the reoccurring time intervals, an indication of intention to transmit UL data by an UL transmission on the indicated UL radio resources in the corresponding reoccurring time interval. Further, execution of the program code causes the at least one processor to, after sending the indication, perform the UL transmission on the indicated UL radio resources in the corresponding reoccurring time interval.

Details of such embodiments and further embodiments will be apparent from the following detailed description of embodiments.

DETAILED DESCRIPTION OF EMBODIMENTS

Figure 1:
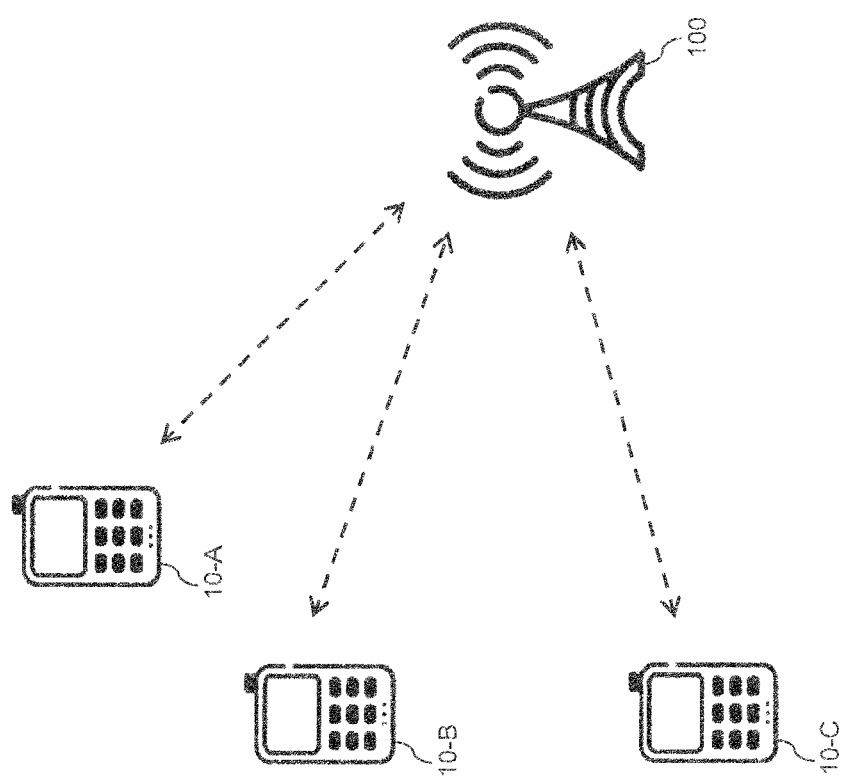
FIG. 1 schematically illustrates an exemplary cellular network environment with elements which may be involved in controlling UL transmissions according to an embodiment of the invention.

In the following, concepts in accordance with exemplary embodiments of the invention will be explained in more detail and with reference to the accompanying drawings. The illustrated embodiments relate to concepts for controlling radio transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, UL transmissions from a communication device to the cellular network are performed on UL radio resources which may be allocated by two types of UL grants: first UL grants, in the following referred to as IUA-UL grant (IUA: Instant UL Access), which each indicate radio resources allocated to the communication device in reoccurring time intervals, and second UL grants, in the following referred to as dynamic UL grant (D-UL grant), which each indicate UL radio resources allocated to the communication device on a one time basis. The radio transmissions may be organized in radio frames each formed of a sequence of subframes, and the above-mentioned time intervals may correspond to the individual subframes. For example, in the LTE radio access technology the time intervals may correspond to TTIs or subframes of 1 ms duration. The IUA-UL grant may be provided to the communication device in preparation of a future UL transmission by the communication device, without any indication of a specific need to transmit UL data by the communication device. As compared to that, the D-UL grants are provided to the communication device in a dynamic manner, in particular on an as-needed basis. For example, a D-UL grant may be sent in response to a scheduling request by the communication device or in response to a BSR from the communication device. The IUA-UL grant and the D-UL grants may be sent on a DL control channel, such as a PDCCH (Physical DL control channel) of the LTE radio access technology. By means of the IUA-UL grants, a low latency associated with a UL transmission by the communication device may be provided. Specifically, on the UL radio resources indicated by the IUA-UL grant, the communication device may perform the UL transmission without previously indicating to the cellular network that there is a need to transmit UL data, e.g., by sending a scheduling request. Rather, the UL data can be transmitted in the next one of the reoccurring time intervals.

In the illustrated concepts, the allocated UL radio resources indicated by the IUA-UL grant may be utilized in a conditional manner. Specifically, for each of the time intervals the communication device may select between an active mode and an inactive mode. In the active mode, the communication device performs a UL transmission on the allocated UL radio resources indicated by the IUA-UL grant. Conditions triggering the selection of the active mode may be a need to send UL data by the communication device or a need to send a BSR by the communication device. In the inactive mode, the communication device performs no UL transmission on the allocated UL radio resources indicated by the IUA-UL grant. The cellular network expects this behavior of the communication device and correspondingly selects between the active mode and the inactive mode. Specifically, the cellular network may detect that the communication device performed a UL transmission on the UL radio resources indicated by the IUA-UL grant and select the active mode to receive the UL transmission. If the UL transmission is received successfully, the cellular network may acknowledge this by sending a positive acknowledgement (ACK) to the communication device. If the UL transmission not received successfully, the cellular network may notify this by sending a negative acknowledgement (NACK) to the communication device. For example, sending of such ACKs or NACKs may be performed on the basis of a HARQ protocol, e.g., as defined for the LTE radio access technology. Further, the cellular network may detect that the communication device performed a UL transmission on the UL radio resources indicated by the IUA-UL grant and select the inactive mode. In the latter case, the cellular network may refrain from attempting to receive any UL transmission on the UL radio resources indicated by the IUA-UL grant or taking any further action concerning such UL transmission, e.g., sending of acknowledgements.

By the conditional utilization of the UL radio resources indicated by the IUA-UL grant, it can be avoided that the communication device needs to perform a UL transmission in each time interval with UL radio resources allocated by the IUA-UL grant, which allows for energy efficient operation of the communication device and may also avoid unnecessary interference due to the UL transmissions on the UL radio resources indicated by the IUA-UL grant.

FIG. 1 illustrates exemplary elements which may be involved in implementing a corresponding control of a UL scheduling process. As examples of communication device which may connect to the cellular network, FIG. 1 illustrates UEs 10-A, 10-B, 10-C. The UEs 10-A, 10-B, 10-C may each correspond to a mobile phone, a smartphone, a computer with wireless connectivity, or the like. As an example of an access node of the cellular network which is responsible for controlling radio transmission by the UEs 10-A, 10-B, 10-C, FIG. 1 illustrates a base station 100. In accordance with the assumed utilization of the LTE radio access technology, the base station 100 will in the following also be referred to as eNB. The eNB 100 is assumed to be responsible for performing the scheduling of UL transmissions, in particular providing the IUA-UL grants and providing the D-UL grants to the UEs 10-A, 10-B, 10-C.

It is to be understood that also other nodes may be involved in controlling at least a part of the UL scheduling process. For example, when utilizing the UMTS radio access technology, a control node referred to as RNC (Radio Network Controller) could implement similar functionalities as explained for the eNB 100.

Figure 2:
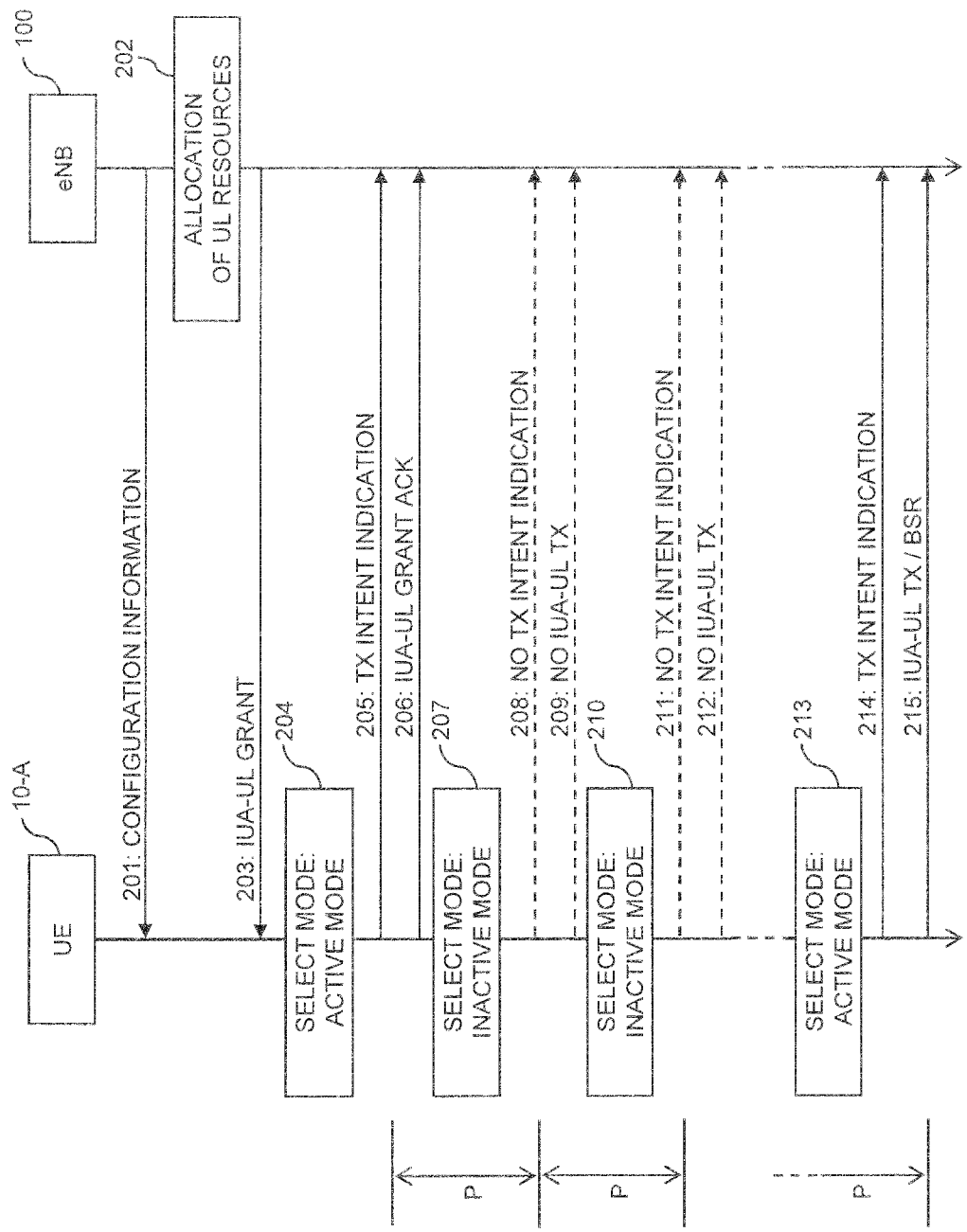
FIG. 2 schematically illustrates an exemplary process for performing UL radio transmissions according to an embodiment of the invention.

FIG. 2 shows an exemplary processes of performing UL transmissions on the basis of the IUA-UL grant. The processes of FIG. 2 involve the UE 10-A and the eNB 100. However, it is to be understood that similar processes could also involve the UE 10-B and the eNB 100 or the UE 10-C and the eNB 100.

As illustrated, the eNB 100 may send configuration information 201 to the UE 10-A. The configuration information 201 may for example indicate radio resources of a UL control channel which are allocated to the UE 10-A, e.g., radio resources of a PUCCH (Physical UL Control Channel). In the concepts as illustrated herein, the configuration information 201 may also indicate a UL radio resource to be utilized for sending an indication of intention to perform a UL transmission on the allocated UL radio resources indicated by a IUA-UL grant, in the following also referred to as TX intent indication. Such UL radio resource is assumed to be configured before each subframe which includes the allocated UL radio resources indicated by the IUA-UL grant. A delay between the configured UL radio resource and the corresponding subframe which includes the allocated UL radio resources indicated by the IUA-UL grant may also be configurable by the configuration information. For example, such delay may correspond to three subframes. A delay of three subframes may leave the eNB 100 sufficient time to perform certain control operations depending on the TX intent indication, such as reallocating the UL radio resources indicated by the IUA-UL grant to another communication device or to send another communication device control information to disable utilization of at least a part of the UL radio resources allocated by the IUA-UL grant. The UL radio resource configured for sending the TX intent indication may be part of the PUCCH. For example, the TX intent indication could be encoded by a bit of the PUCCH. Further, the UL radio resource configured for sending the TX intent indication may be part of a another UL control channel, encoded independently from the PUCCH.

Further, the configuration information 201 could also provide various other kinds of information for establishing connectivity between the UE 10-A and the eNB 100. The configuration information 201 may also indicate a configuration to be utilized by the UE 10-A for various kinds of reporting to the cellular network, e.g., reporting of Channel State Information (CSI) or conditions for triggering a BSR. The configuration information 201 may for example be sent in an RRC (Radio Resource Control) message or by some other form of control signaling, e.g., in an MIB (Master Information Block) or SIB (System Information Block).

At step 202, the eNB 100 may allocate UL radio resources to the UE 10-A. Specifically, the eNB 100 allocates these UL radio resources in reoccurring time intervals to the UE 10-A, e.g., in each subframe or in some other predefined sequence of subframes, such as in every second subframe, every third subframe, every fourth subframe, or the like. These UL radio resources may be radio resources of a PUSCH (Physical UL Shared Channel).

The eNB 100 then sends an IUA-UL grant 203 to the UE 10-A. The IUA-UL grant 203 may be sent on the PDCCH. The IUA-UL grant 203 indicates the UL radio resources allocated at step 202. For example, the allocated UL radio resources may be indicated in terms of one or more resource blocks (RBs). Further, the IUA-UL grant 203 may also indicate a periodicity in which the allocated UL radio resources reoccur. Alternatively, such periodicity could also be indicated by separate control information, e.g., the control information 201. In FIG. 2, the periodicity in which the allocated UL radio resources reoccur is indicated by P, corresponding to a time offset between two time intervals with UL radio resources allocated by the IUA-UL grant. In the following this time interval is also referred to as IUA period.

The IUA-UL grant 203 may be provided with an indicator which allows the UE 10-A to distinguish the IUA-UL grant 203 from other types of grants, e.g., a D-UL grant. Such indicator may for example be included in an information field of the IUA-UL grant 203. Further, the indicator could also be provided by utilizing a specific identifier to address the IUA-UL grant to the UE 10-A, e.g., a specific C-RNTI (Cell Radio Network Temporary Identity). For example, a one C-RNTI could be provided for addressing IUA-UL grants to the UE 10-A, and one or more other C-RNTIs could be provided for addressing other types of IUA-UL grants to the UE 10-A, such as D-UL grants. In some scenarios, the IUA-UL grant 203 may also include configuration information for setting the delay between the UL radio resources for the TX intent indication and the the corresponding subframe which includes the allocated UL radio resources indicated by the IUA-UL grant.

After receiving the IUA-UL grant 203, the UE 10-A may enter an IUA operation, in which the UL radio resources indicated by the IUA UL grant 203 may be instantly utilized for performing low latency UL transmissions, without a need to beforehand go through the dynamic scheduling process. In the IUA operation, the UE 10-A checks for each of the time intervals with the allocated UL resources whether a condition for selecting the active mode is met. If this is the case, the UE 10-A selects the active mode to perform a UL transmission on the allocated UL radio resources. Before performing the UL transmission, the UE 10-A sends a TX intent indication. This is accomplished on the above-mentioned configured UL radio resources which correspond to the subframe in which the UL transmission will take place. If this is not the case, the UE 10-A selects the inactive mode and performs no transmission on the allocated UL radio resources, and also does not send the TX intent indication.

As illustrated by step 204, for the first time interval with allocated UL resources indicated by the IUA-UL grant 203, the UE 10-A may select the active mode, send a TX intent indication 205, and perform a UL transmission on the allocated resources which includes an acknowledgement of receipt (IUA-UL grant ACK) 206 for the IUA-UL grant 203. The IUA-UL grant acknowledgement 206 may confirm to the eNB 100 that the UE 10-A entered the IUA operation, which for example means that the eNB 100 should expect a UL transmission on the UL radio resources indicated by the IUA-UL grant 203 if this is beforehand indicated by a TX intent indication. The IUA-UL grant acknowledgement 206 may for example correspond to a IUA-UL transmission with padding, i.e., without actual UL data but a predefined or random data pattern, such as only zeros.

As further illustrated by steps 207 and 210, for some time intervals with allocated UL radio resources indicated by the IUA-UL grant 203, the UE 10-A may select the inactive mode. In this case, the UE 10-A performs no UL transmission on the allocated UL radio resources indicated by the IUA-UL grant (no IUA-UL TX), as indicated by the dashed arrows 209 and 212, and thus also does not send the TX intent indication, as indicated by the dashed arrows 208 and 211.

As further illustrated by step 213, for some time intervals with allocated UL radio resources indicated by the IUA-UL grant 203, the UE 10-A may select the active mode to perform a UL transmission on the allocated UL radio resources indicated by the IUA-UL grant. Selecting the active mode at step 213 may for example be triggered by a need for transmission of UL data by the UE 10-A. The UE 10-A then first sends the TX intent indication 214 on the configured UL radio resource and then proceeds to perform the UL transmission (IUA-UL TX) 215. The IUA-UL transmission 215 may include at least a part of the UL data and a BSR. Selecting the active mode at step 213 could also be triggered by a need to send a BSR by the UE 10-A, without a need for transmission of UL data. In such case, the IUA-UL transmission 215 may include the BSR, but no UL data.

Figure 3:
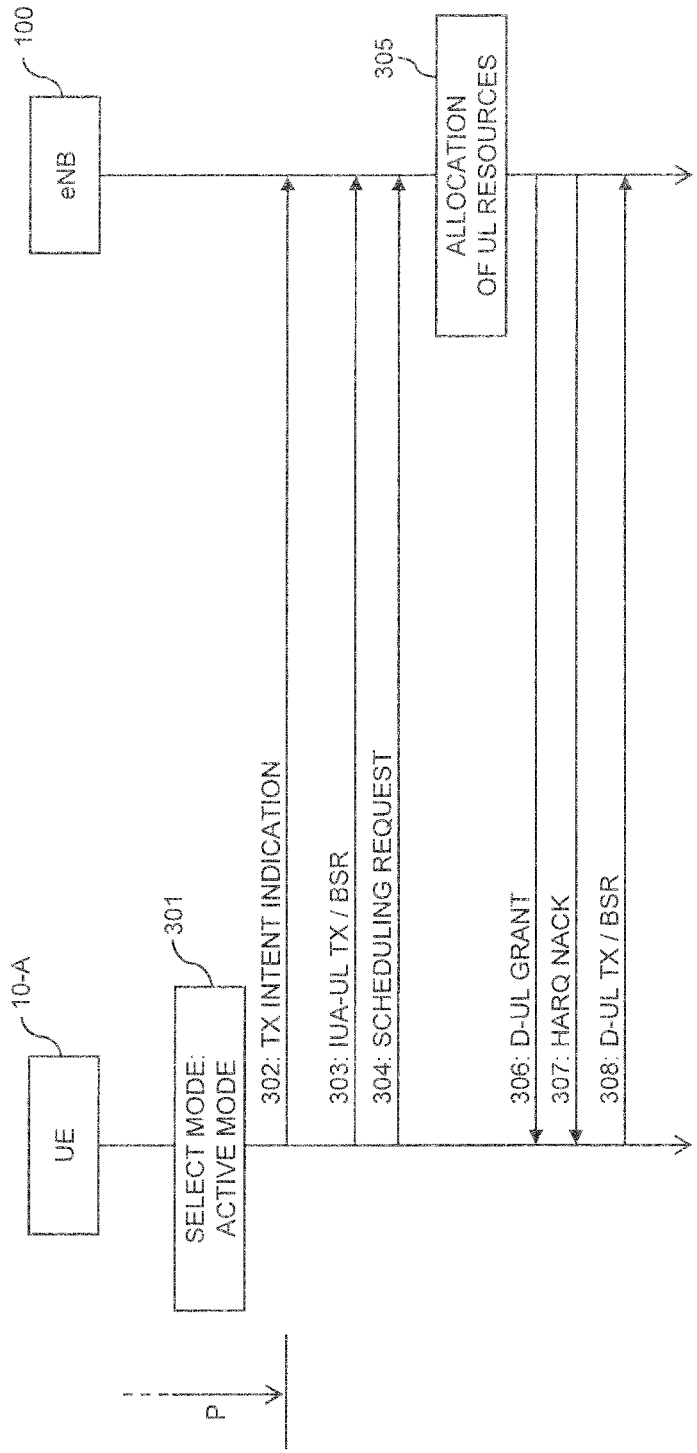
FIG. 3 schematically illustrates further exemplary process for performing UL radio transmissions according to an embodiment of the invention.

FIG. 3 shows further exemplary processes of performing UL transmissions on the basis of the IUA-UL grant. Also the processes of FIG. 3 involve the UE 10-A and the eNB 100. The processes of FIG. 3 may for example be performed in the IUA operation of the UE 10-A, after receiving the IUA-UL grant.

As indicated by step 301, for a certain time interval with allocated UL radio resources indicated by the IUA-UL grant, the UE 10-A may select the active mode to perform a UL transmission of UL data on the allocated UL radio resources indicated by the IUA-UL grant. Accordingly, the UE 10-A will first send a TX intent indication 302 and then perform IUA-UL transmission 303 (which may also include a BSR).

In addition to sending the IUA-UL transmission 303, the UE 10 may also send a scheduling request 304 to the eNB 100.

As indicated by step 305, in response to the scheduling request 304 the eNB 100 performs allocation of further UL radio resources to the UE 10. The eNB 100 sends a D-UL grant 306 to the UE 10-A which indicates these further allocated UL radio resources.

In the processes of FIG. 3, it is further assumed that the IUA-UL transmission 303 could not be successfully received by the eNB 100, e.g., due to poor radio link adaptation between the UE 10-A and the eNB 100. Accordingly, the eNB 100 notifies the UE 10-A of the failed reception by sending a HARQ NACK 307.

The HARQ NACK 307 causes the UE 10 to retransmit the UL data on the further allocated UL radio resources indicated by the D-UL grant 306, as indicated by dynamic UL transmission (D-UL TX) 308. Similar to IUA-UL transmission 303, also the D-UL transmission 308 may include a BSR.

In the processes of FIG. 3, sending the scheduling request 306 together with the initial IUA-UL transmission 303 allows for avoiding additional delays if the IUA-UL transmission fails, i.e., for achieving a similar performance with respect to latency as in the case of utilizing only scheduling request based dynamic scheduling.

Figure 4:
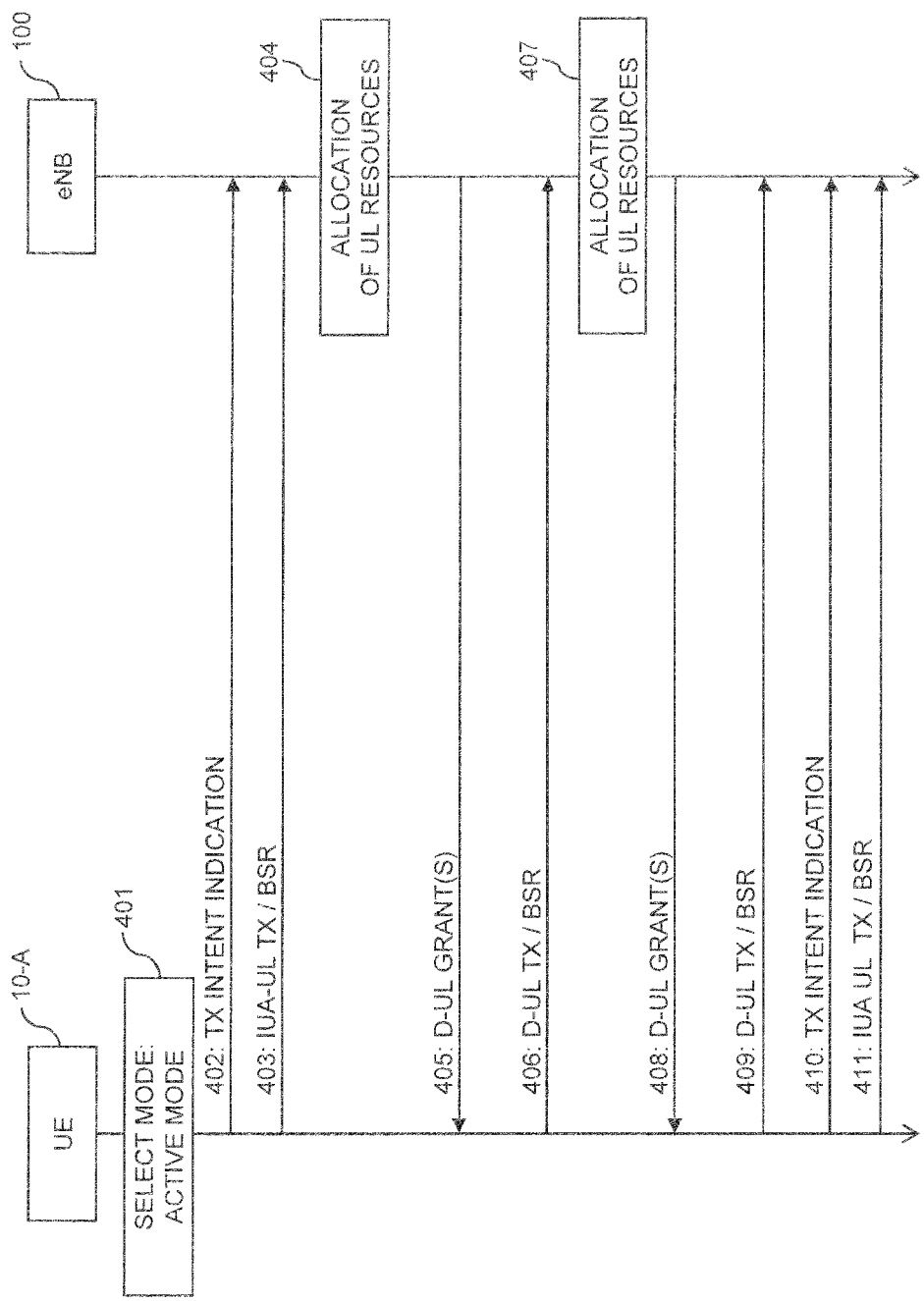
FIG. 4 schematically illustrates further exemplary process for performing UL radio transmissions according to an embodiment of the invention.

FIG. 4 shows further exemplary processes of performing UL transmissions on the basis of the IUA-UL grant. Also the processes of FIG. 4 involve the UE 10-A and the eNB 100. The processes of FIG. 4 may for example be performed in the IUA operation of the UE 10-A, after receiving the IUA-UL grant.

As indicated by step 401, for a certain time interval with allocated UL radio resources indicated by the IUA-UL grant, the UE 10-A may select the active mode to perform a UL transmission of UL data on the allocated UL radio resources indicated by the IUA-UL grant. Accordingly, the UE 10-A will first send a TX intent indication 402 and then perform a IUA-UL transmission 403. As illustrated, the IUA-UL transmission 403 also includes a BSR. The BSR indicates an amount of further UL data pending for transmission by the UE 10-A.

As indicated by step 404, on the basis of the BSR in IUA-UL transmission 403, the eNB 100 performs allocation of further UL radio resources to the UE 10-A. The eNB 100 sends one or more D-UL grants 405 to the UE 10, which indicate these further allocated UL radio resources.

The UE 10-A may then transmit at least a part of the further UL data on the further allocated UL radio resources indicated by the D-UL grant(s) 405, as indicated by D-UL transmission 406. Also D-UL transmission 406 includes a BSR which indicates an amount of further UL data pending for transmission by the UE 10-A.

As indicated by step 407, on the basis of the BSR in D-UL transmission 406, the eNB 100 performs allocation of further UL radio resources to the UE 10-A. The eNB 100 sends one or more further D-UL grant 408 to the UE 10-A, which indicate these further allocated UL radio resources.

The UE 10-A may then transmit at least a part of the further UL data on the further allocated UL radio resources indicated by the D-UL grant 408, as indicated by D-UL transmission 409. Again, D-UL transmission 409 includes a BSR which indicates an amount of further UL data pending for transmission by the UE 10-A.

The UE 10-A may also perform a further IUA-UL transmission at a later time interval with allocated UL radio resources indicated by the IUA-UL grant. As illustrated, this may involve that the UE 10-A will first send a TX intent indication 410 in the UL radio resource corresponding to this time interval, and then perform the IUA-UL transmission 411. As illustrated, the IUA-UL transmission 411 may also include a BSR which indicates an amount of further UL data pending for transmission by the UE 10-A.

As can be seen from the processes of FIG. 4, the BSR in a IUA-UL transmission may trigger allocation of further UL radio resources which may then be indicated in a D-UL grant. These further allocated UL radio resources may then be used alternatively or in addition to the UL radio resources indicated by the IUA-UL grant for transmission of UL data. In this way, the amount of UL radio resources allocated to the UE 10 may be dynamically adapted to the current UL traffic demand of the UE 10, while at the same time allowing fast initial access to UL radio resources.

In the processes of FIGS. 2, 3, and 4, the UE 10-A sends the TX intent indication before actually performing the IUA-UL transmission. This is accomplished on the UL radio resource configured for this purpose. As mentioned above, this UL radio resources is configured before each time interval which can be used for a IUA-UL transmission. The delay between the UL radio resources configured for the TX intent indication and the IUA-UL transmission may be configurable, e.g., by the above-mentioned configuration information 201 or by configuration information provided in the IUA-UL grant 203. As will be further explained below, a useful delay may correspond to three subframes. It should also be noted that such delay between the TX intent indication and the IUA-UL transmission may not be accurately represented by the schematic timings of FIGS. 2, 3, and 4.

Figure 5:
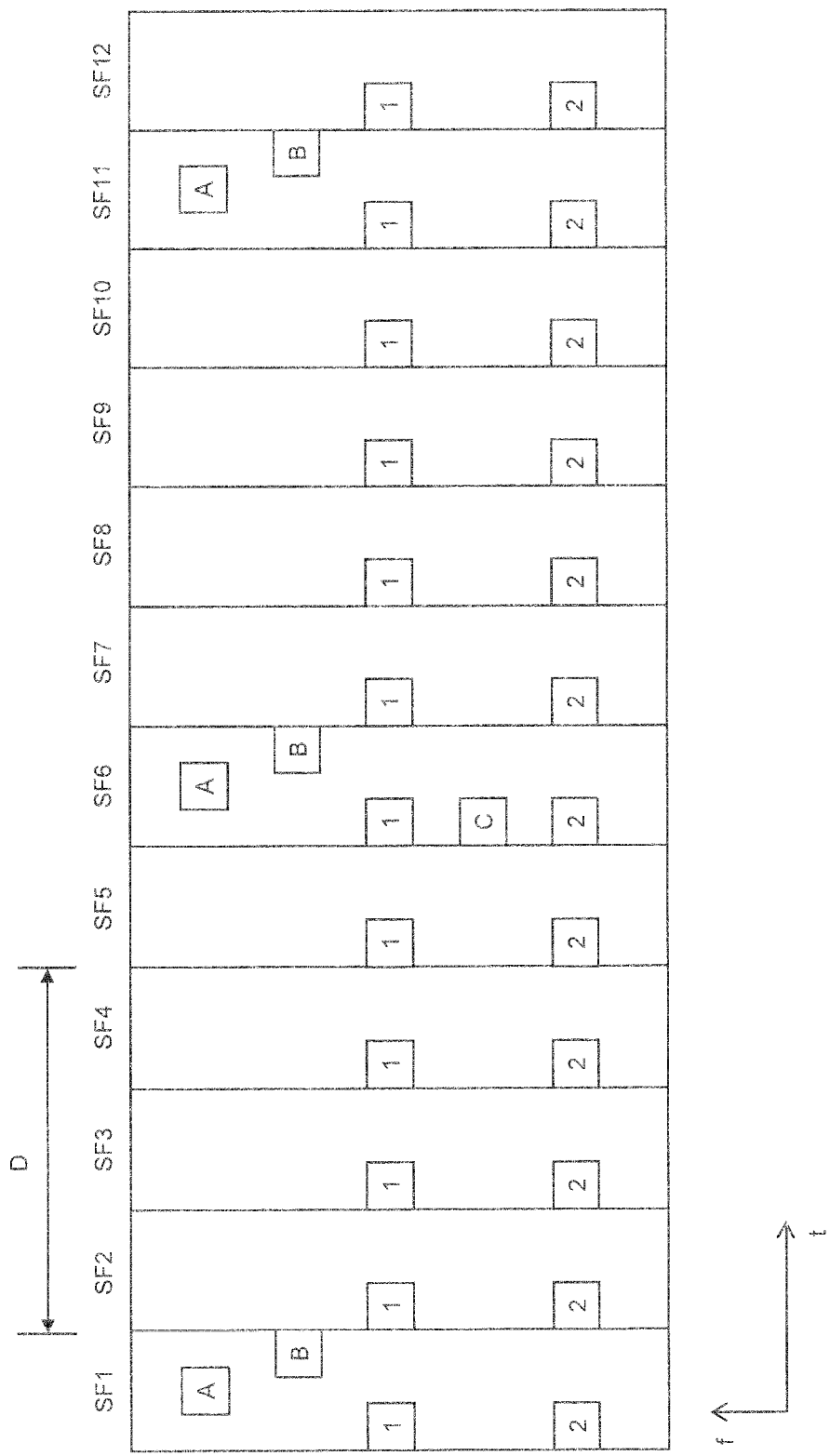
FIG. 5 schematically illustrates an example of a sequence of subframes as used according to an embodiment of the invention.

FIG. 5 shows an example of how the UL radio resource for sending the TX intent indication may be configured in a scenario involving multiple UEs, such as illustrated in FIG. 1. Specifically, FIG. 5 shows a time (t)/frequency (f) grid with sequence of subframes SF1, SF2, SF3, SF4, SF5, SF6, SF7, SF8, SF9, SF10, SF11, SF12. In each of these subframes, it is assumed that first UL radio resources are allocated by a first IUA-UL grant to a first UE, e.g., to the UE 10-A, and that second UL radio resources are allocated by a second IUA-UL grant to a second UE, e.g., to the UE 10-B. In FIG. 5, the UL radio resources configured for sending the TX intent indication for the first UL radio resources are allocated by the first IUA-UL grant are illustrated by boxes marked by "1", and the UL radio resources configured for sending the TX intent indication for the second UL radio resources are allocated by the second IUA-UL grant are illustrated by boxes marked by "2". Further, FIG. 5 illustrates opportunities for sending a scheduling request by the first UE as boxes marked by "A", and opportunities for sending a scheduling request by the second UE as boxes marked by "B". Further, FIG. 5 also illustrates the delay D between the UL radio resources configured for sending the TX intent indication and the UL radio resources in which the IUA-UL transmission is then performed. As can be seen, this delay is assumed to correspond to a duration of three subframes. That is to say, if the TX intent indication is sent in a certain subframe, the IUA-UL transmission is performed in the third subframe succeeding this subframe. As can be further seen, in the example of FIG. 5 it is assumed that the opportunities of sending a scheduling request are not provided in every subframe, but only in every fifth subframe. Accordingly, for a given UE the UL radio resource for sending the TX intent indication occurs more frequently than the opportunity of sending a scheduling request.

Figure 6:
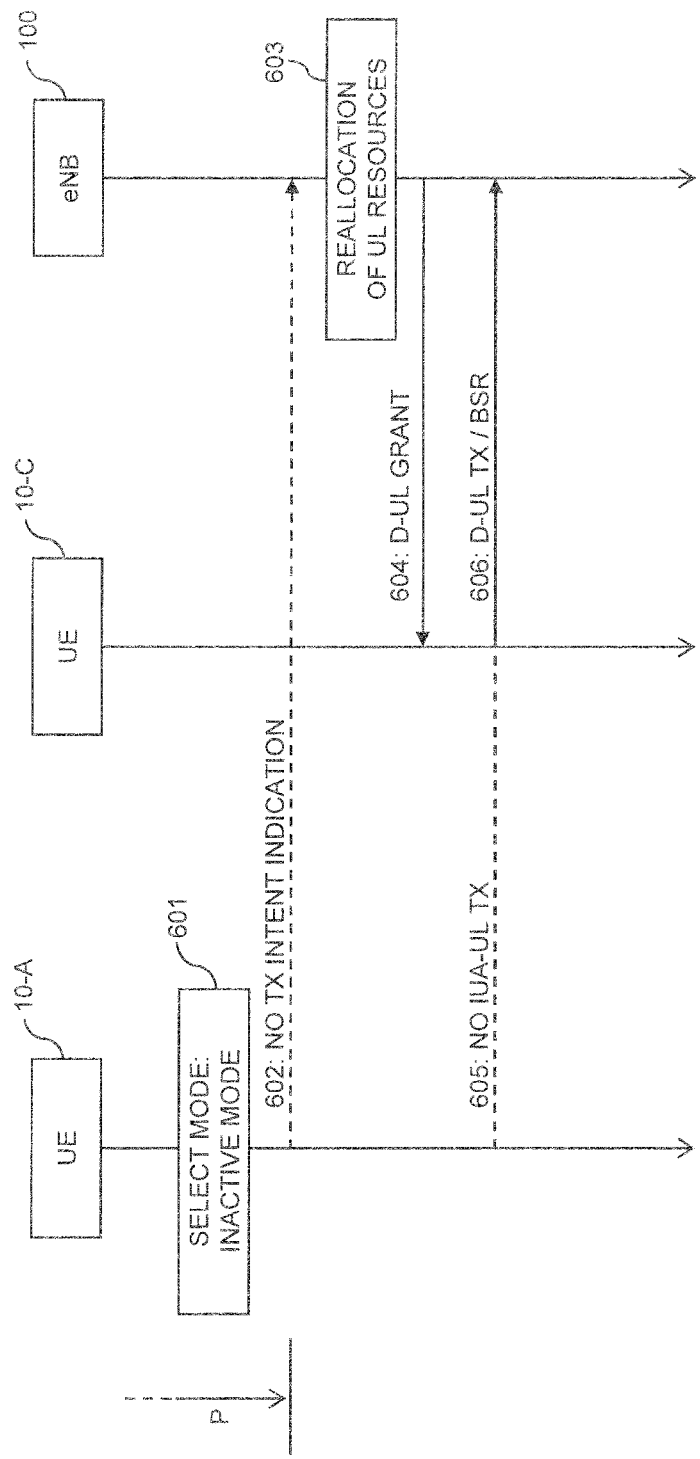
FIG. 6 schematically illustrates further exemplary process for performing UL radio transmissions according to an embodiment of the invention.

In the illustrated concepts, it is assumed that the eNB 100 utilizes the TX indication for achieving efficient utilization of UL radio resources. In particular, depending on whether or not the TX intent indication is detected, the eNB 100 may predict whether the communication device, to which the UL radio resources were allocated by the IUA-UL grant, will actually perform a UL transmission in the corresponding time interval. If this is not the case, the eNB 100 may reallocate the UL radio resources to another communication device, e.g., by sending a D-UL grant to this other communication device or by modifying the existing IUA-UL grant and sending a further IUA-UL grant to the further communication device. An example of a corresponding process is illustrated in FIG. 6. The processes of FIG. 6 involve the UE 10-A, the UE 10-C, and the eNB 100. The processes of FIG. 6 may for example be performed in the IUA operation of the UE 10-A, after the UE 10-A received the IUA-UL grant 203.

As indicated by step 601, for a certain time interval with allocated UL radio resources indicated by the IUA-UL grant, the UE 10-A may select the inactive mode, e.g., because there is no UL data pending for transmission by the UE 10-A and no condition for triggering sending of a BSR by the UE 10-A is met. Accordingly, the UE 10-A will not send the TX intent indication on the UL radio resource configured for this time interval, as indicated by dashed arrow 602.

The eNB 100 monitors the UL radio resource configured for sending the TX intent indication and, in response to not detecting the TX intent indication, reallocates the UL radio resources of the IUA-UL grant in the considered time interval to the UE 10-C, as indicated by step 603. For example, on the basis of a scheduling request or BSR from the UE 10-C, the eNB 100 may have determined that the UE 10-C needs to perform an UL transmission and thus reallocate the UL radio resources which in the considered time interval are not needed by the UE 10-A to the UE 10-C. For this purpose, the UL radio resources of the IUA-UL grant may be temporarily made available to the dynamic scheduling process of the UE 10-C.

Having reallocated the UL radio resources, the eNB 100 may indicate the radio resources which are now allocated to the UE 10-C by sending a D-UL grant 604 to the UE 10-C. On these UL radio resources, the UE 10-C may then perform a D-UL transmission 605, which may also include a BSR.

In some scenarios, in which the eNB 100 does not detect the TX intent indication but also determines no need of another communication device to perform a UL transmission in the corresponding time interval, the eNB 100 may also react by switching to a mode in which monitoring of the UL radio resources of the IUA-UL grant is deactivated in the considered time interval. This may allow for saving energy on the network side, specifically in scenarios where UL transmissions are performed in a sparse timing, such as often the case with MTC (Machine Type Communication) devices.

Figure 7:
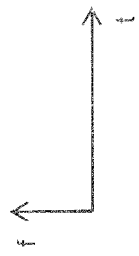
FIG. 7 shows an example of an allocation of UL radio resources according to an embodiment of the invention.

FIG. 7 schematically illustrates an exemplary allocation of UL radio resources for performing the UL transmissions. Specifically, FIG. 7 shows a possible allocation of UL radio resources by three IUA-UL grants to three different sets of one or more communication devices in a sequence of subframes SF1, SF2, SF3, SF4, SF5. For example, when assuming the scenario of FIG. 1, the UE 10-A and the UE 10-B could be part of a first set of communication devices to which first UL radio resources are allocated by a first IUA-UL grant (IUA RES 1), and the UE 10-C could be part of a second set of communication devices to which second UL radio resources are allocated by a second IUA-UL grant (IUA RES 2). As illustrated in FIG. 7, the first UL radio resources and the second UL radio resources are non-overlapping. Accordingly, a collision of UL transmissions by communication devices from the first set with UL transmissions by communication devices from the second set can be avoided. However, since within each the allocated UL radio resources are shared, there is a risk of a collision when two or more communication devices decide to perform an UL transmission in the same subframe.

The above-mentioned overlapping allocation of UL radio resources may be efficient in view of the UL radio resources allocated by the IUA-UL grant being utilized in a conditional manner, e.g., as explained above by selecting between the active mode and the inactive mode. Due to the conditional utilization, a IUA-UL transmission is not performed on every possible occasion, which means that there is only a certain probability of a conflict of IUA-UL transmissions different communication devices to which the same UL radio resources are allocated by the IUA-UL grant.

For avoiding such collisions, the eNB 100 may react to the detected TX intent indication by controlling one or more of the communication devices to which the shared UL radio resources are allocated, to disable utilization the shared UL radio resources. This temporary disabling of the utilization may be achieved by sending corresponding control information to the communication device. The control information may be sent on a DL control channel, e.g., a PDCCH of the LTE radio access technology, utilizing a similar mechanism or format as for sending the D-UL grants or the IUA-UL grant. However, a part of the control information could also be provided by other control signaling, e.g., by an RRC message. For example, a duration of time period for which the utilization of the UL radio resources allocated by the IUA-UL grant is to be disabled and/or an offset between transmission of the control information and the disabling of the utilization could be indicated beforehand by such other control signaling to the communication device, e.g., in the configuration information 201 of FIG. 2, and then be applied when the disabling is triggered by a message on the DL control channel. In examples as further described in the following, it will be assumed that the disabling is triggered by a DCI (DL control information) message on the PDCCH which utilizes the same or a similar format as applied for sending the D-UL grants or IUA-UL grants. Such control message will in the following also be referred to as a "hold grant".

Similar to a D-UL grant, the hold grant may be valid for a specific TTI, e.g., defined by a number of TTIs from receipt of the hold grant. For example, the hold grant could trigger the disabling of the utilization of the allocated UL radio resources in the fourth TTI from reception of the hold grant. In some scenarios, the hold grant could also include further information specifying a number of TTIs for which the utilization of the allocated UL radio resources is to be disabled. Further, the hold grant could be valid until further control information is received to re-enable the utilization of the allocated UL radio resources, e.g., in the form of a further hold grant or other DCI message. If merely the disabling is to be triggered, the hold grant can be indicated by a single bit in the DCI.

In some scenarios, if utilization of the shared UL radio resources by multiple communication devices needs to be disabled, the hold grant could be addressed as a broadcast message to these multiple communication devices. This addressing could be achieved by utilizing a specific C-RNTI assigned to the multiple communication devices. Such C-RNTI could be preconfigured in the communication device or could be indicated to the communication device in configuration information, e.g., in the configuration information 201 of FIG. 2.

Further, in some scenarios multiple communication devices may simultaneously decide to perform a UL transmission on the shared UL radio resources and concurrently send the TX intent indication. For such scenarios, the UL radio resource for sending the TX intent indication may be shared by the multiple communication devices. From the perspective of the eNB 100, the presence of the TX intent indication from at least one of the communication devices is sufficient to decide that the UL radio resources should be monitored by the eNB 100 and not be reallocated. In some scenarios, the eNB 100 may also estimate the number of communication devices which sent the TX intent indication from a received signal power in the UL radio resource configured for sending the TX intent indication. If this number exceeds one, the eNB 100 may react by allocating other UL radio resources to one or more of the communication devices, e.g., by sending a D-UL grant. Further, the eNB 100 may react by sending a hold grant to one or more of the communication devices to which the shared UL radio resources were allocated. In this way, colliding transmissions on the shared UL radio resources can be avoided.

Figure 8:
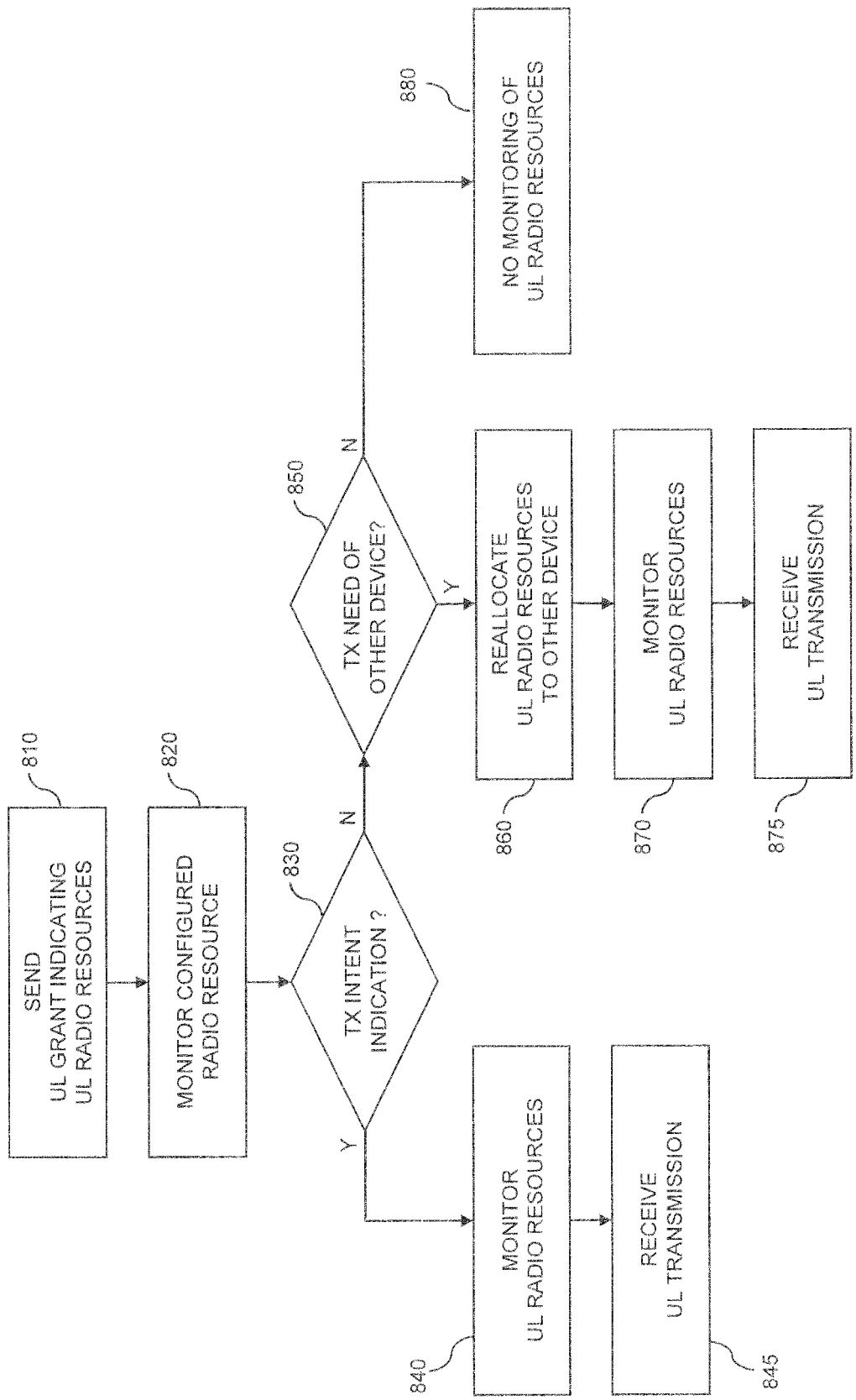
FIG. 8 shows a flowchart for illustrating a method according to an embodiment of the invention, which may be implemented by an access node.

FIG. 8 shows a flowchart for illustrating a method of controlling radio transmission in a cellular network. The method may be used for implementing the above-described concepts in an access node of the cellular network, e.g., in a node which is responsible for scheduling transmissions, such as the eNB 100 or an RNC when using the UMTS radio access technology. If a processor based implementation of the access node is used, the steps of the method may be performed by one or more processors of the access node. For this purpose, the processor(s) may execute correspondingly configured program code. Further, at least some of the corresponding functionalities may be hardwired in the processor(s).

At step 810, the access node sends a UL grant to a communication device, e.g., to the UE 10. The node may send the UL grant on a DL control channel, e.g., a PDCCH of the LTE radio access technology. The UL grant indicates UL radio resources allocated to the communication device in reoccurring time intervals. Examples of such UL grant are the IUA-UL grants 203. Further, the UL grant could also correspond to another type of long lasting grant, e.g., an SPS grant. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

The access node may send the UL grant in response to detecting a change of a connection status of the communication device, e.g., when the communication device enters the cellular network and connects thereto, when the communication device enters a different cell or area of the cellular network, or the like. Further, the node may send the UL grant according to a periodic schedule, e.g., every minute or hour. In each case, no request for the UL grant by the communication device is required.

For each of the time intervals indicated at step 810, the access node may select between an active mode and an inactive mode. In the active mode the communication device performed a UL transmission in the allocated UL radio resources. In the inactive mode the communication device performed no UL transmission in the allocated UL radio resources. Accordingly, the node decides for each of the time intervals whether the communication device performed a transmission on the allocated UL radio resources. This may for example be accomplished by detecting signals from the communication device in the allocated UL radio resources. In response to detecting no signals from the communication device in the allocated UL radio resources, the node may select the inactive mode. In response to detecting signals from the communication device in the allocated UL radio resources, the node may select the active mode.

At step 820, the access node monitors a UL radio resource. The UL radio resource may correspond to a specific resource element of a time frequency grid, e.g., have a duration of one symbol and cover a frequency range corresponding to one subcarrier. The UL radio resource is configured before each of the reoccurring time intervals, e.g., in a directly preceding TTI or in an n-th TTI before the subframe, where n is an integer which may be configurable. In some scenarios, the UL radio resource may also be associated with a group of the reoccurring time intervals and be configured before that one of the reoccurring time intervals of the group which comes first in time. In such scenarios, the UL radio resource could be configured before each group of multiple reoccurring time intervals, without requiring configuration of the UL radio resource between the reoccurring time intervals of the same group. For each of the reoccurring time intervals, the UL radio resource may be located at the same position in the time frequency grid. The access node monitors the UL radio resource for an indication of intention to transmit UL data by an UL transmission on the UL radio resources indicated by the UL grant of step 810, in the reoccurring time interval corresponding to this UL radio resource, i.e., for a TX intent indication with respect to the corresponding time interval.

The TX intent indication may be utilized in various ways by the access node. For example, on the basis of whether the TX intent indication is detected or not, the access node may decide whether to reallocate the indicated UL radio resources and/or whether to monitor the indicated UL radio resources, e.g., as further explained below.

In response to not detecting the TX intent indication and determining a need for an UL transmission in the corresponding reoccurring time interval by a further communication device, the access node reallocates the indicated UL radio resources in the corresponding time interval to the further communication device. As illustrated by step 830 of FIG. 8, this may involve whether the TX intent indication is present. If this is the case, the method may proceed to step 840, as indicated by branch "Y".

At step 840, the access node may select a first mode in which monitoring of the UL radio resources indicated by the grant of step 810 is active and then, at step 845 receive a UL transmission on these UL radio resources.

If the check of step 830 reveals that no TX intent indication was detected, the method may proceed to step 850, as indicated by branch "N". At step 850, the access node may determine whether there is the need for an UL transmission in the corresponding reoccurring time interval by a further communication device. For example such need may be determined to be present if the access node received a scheduling request from the further communication device, if the access node received a BSR indicating pending UL data from the further communication device, or if the access node sent a HARQ NACK with respect to an UL transmission by the further communication device which means that the further communication device needs to perform a retransmisssion. If such need is found to be present, the method may proceed to step 860, as indicated by branch "Y".

At step 860, the access node performs the reallocation of the UL radio resources indicated by the UL grant of step 810 to the further communication device. For example, this may involve entering the UL radio resources as available UL radio resources into a scheduling process and then sending a further UL grant, which indicates the reallocated UL radio resources, to the further communication device. The further UL grant may for example be a UL grant of a dynamic scheduling process such as the above-mentioned D-UL grants. In some scenarios, the reallocated UL radio resources could also be indicated by a long lasting grant, such as the above-mentioned IUA-UL grant or an SPS grant. When utilizing a long lasting grant for indicating the reallocated UL radio resources, the UL grant of step 810 may be modified. For example, if the UL radio resources indicated by the UL grant of step 810 were not utilized by the communication device for some time, the UL grant of step 810 could be cancelled at least in part. In some scenarios, the reallocated UL radio resources could also be shared by the communication device and the further communication device.

At step 870, the access node may monitor the reallocated UL radio resources and then, at step 875 receive a UL transmission on the reallocated UL radio resources.

If the check of step 850 reveals that no need to perform a UL transmission by another communication device is present, the method may proceed to step 880, as indicated by branch "N".

At step 880, the access node may select a mode in which monitoring of the UL radio resources indicated by the UL grant of step 810 in the reoccurring time interval for which no TX intent indication was detected is inactive, thereby enabling energy efficient operation of the access node.

In view of the above-described functionalities, an access node for implementing the illustrated concepts may be provided with a module configured to send the UL grant indicating the UL radio resources allocated in reoccurring time intervals, such as explained in connection with step 810, a module configured to monitor the configured UL radio resource for the TX intent indication, such as explained in connection with step 820, and a module configured to perform reallocation of the UL radio resources depending on detection of the TX intent indication, such as explained in connection with steps 830, 840, 845, 850, 860, 870, 875, and 880.

In some scenarios, the UL radio resources indicated by the UL grant of step 810 may be allocated to a group of multiple communication devices, such as explained in connection with FIG. 7. The UL radio resource configured for the TX intent indication may then be shared by the communication devices of the group. Based on a received signal strength in the configured uplink radio resource, the access node may then estimate a number of communication devices with intention to perform a UL transmission on the shared UL radio resources. In response to estimated number of communication devices being larger than one, the access node may allocate new UL radio resources in the corresponding reoccurring time interval to at least one of the communication devices of the group.

A delay between the UL radio resource configured for the TX intent indication and the corresponding reoccurring time interval may be configured by the access node. For example, this configuration could be accomplished by sending corresponding configuration information, such as the configuration information 201. In some cases, such configuration information could also be transmitted as part of the UL grant of step 810.

Figure 9:
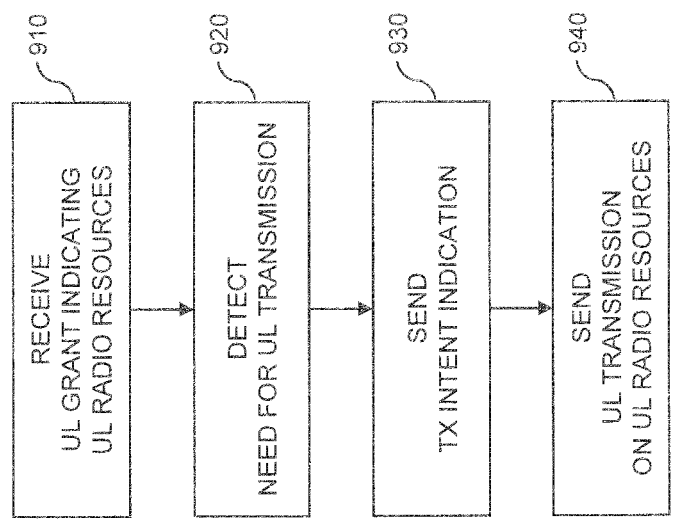
FIG. 9 shows a flowchart for illustrating a further method according to an embodiment of the invention, which may be implemented by a communication device.

FIG. 9 shows a flowchart for illustrating a method of controlling radio transmission in a cellular network. The method may be used for implementing the above-described concepts in a communication device with connectivity to the cellular network, e.g., the UE 10. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 910, the communication device receives a UL grant from the cellular network, e.g., from the eNB 100. The communication device may receive the UL grant on a DL control channel, e.g., a PDCCH of the LTE radio access technology. The UL grant indicates UL radio resources allocated to the communication device in reoccurring time intervals. Examples of such UL grant are the IUA-UL grants 203. Further, the UL grant could also correspond to another type of long lasting grant, e.g., an SPS grant. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

In some scenarios, the UL radio resources allocated by the UL grant of step 910 may be overlapping with UL radio resources which are allocated by a further UL grant to a further communication device, e.g., the UE 10-B or 10-C.

For each of the time intervals indicated at step 910, the communication device may select between an active mode and an inactive mode. In the active mode the communication device performs a UL transmission in the allocated UL radio resources. In the inactive mode the communication device performs no UL transmission in the allocated UL radio resources.

Accordingly, the utilization of the UL radio resources allocated by the UL grant of step 910 may be conditional.

The selection may involve that the communication device checks whether there is a need to perform a UL transmission, as indicated by step 920. This may for example involve checking if UL data is available for transmission by the communication device. In response to UL data being available for transmission, the communication device may select the active mode to perform a UL transmission which includes at least a part of the UL data.

In response to UL data being available for transmission, the communication device may also send a scheduling request to the cellular network, thereby requesting allocation of further UL radio resources to the communication device. An example of such scheduling request is the scheduling request 304.

Further, the selection may also involve that the communication device checks whether one or more conditions for sending a BSR, indicating an amount of UL data available for transmission by the communication device, are met. In response to one or more of such conditions being met, the communication device may selecting the active mode to send a UL transmission including the BSR.

At step 930, when selecting the active mode for a given one of the reoccurring time intervals, the communication device sends an indication of intention to transmit UL data by an UL transmission on the UL radio resources indicated by the UL grant of step 910, in this reoccurring time interval, i.e., a TX intent indication. This is accomplished on an UL radio resource configured before each of the reoccurring time intervals. For sending the TX indication, the communication device utilizes the UL radio resources corresponding to the reoccurring time interval in which the transmission of the UL data is intended. The UL radio resource may correspond to a specific resource element of a time frequency grid, e.g., have a duration of one symbol and cover a frequency range corresponding to one subcarrier. The UL radio resource is configured before each of the reoccurring time intervals, e.g., in a directly preceding TTI or in an n-th TTI before the subframe, where n is an integer which may be configurable. For each of the time intervals, the UL radio resource may be located at the same position in the time frequency grid.

At step 940, after sending the indication, the communication device performs the UL transmission on the UL radio resources indicated by the UL grant of step 910 in the reoccurring time interval corresponding to the UL radio resources in which the TX intent indication of step 930 was transmitted.

In some scenarios, the UL radio resources indicated by the UL grant of step 910 may be allocated to a group of multiple communication devices, i.e., to the communication device and to one or more further communication devices, such as explained in connection with FIG. 7. The UL radio resource configured for the TX intent indication may then be shared by the communication devices of the group.

A delay between the UL radio resource configured for the TX intent indication and the corresponding reoccurring time interval may be configurable. For this purpose, the communication device may receive control information from the cellular network and, depending on the control information, configure the delay between the configured UL radio resource and the corresponding reoccurring time interval. An example of such configuration information is the configuration information 201. In some cases, such configuration information could also be transmitted as part of the UL grant of step 910.

In view of the above-described functionalities, a communication device for implementing the illustrated concepts may be provided with a module configured to receive the UL grant indicating the UL radio resources allocated in reoccurring time intervals, such as explained in connection with step 910, a module configured to send the TX intent indication on the configured UL radio resource, such as explained in connection with steps 920 and 930, and a module configured to perform the UL transmission, such as explained in connection with step 940.

It is to be understood that the methods of FIGS. 8 and 9 may be combined, e.g., in a system including an access node operating according to the method of FIG. 8 and a communication device operating according to the method of FIG. 9.

Figure 10:
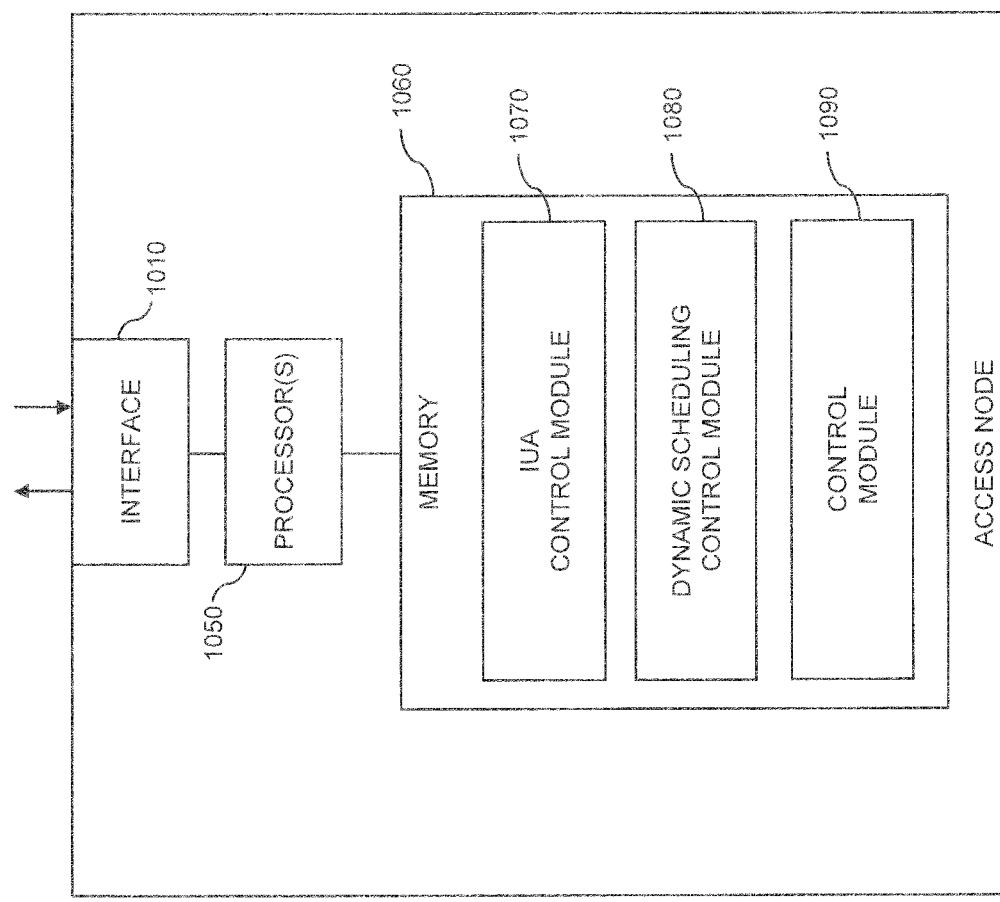
FIG. 10 schematically illustrates structures of an access node according to an embodiment of the invention.

FIG. 10 illustrates exemplary structures which may be used for implementing the above concepts in an access node of a cellular network, e.g., the eNB 100.

As illustrated, the access node may include an interface 1010 for connecting to communication devices, e.g., to the UEs 10-A, 10-B, 10-C. The interface 1010 may be utilized for sending the above-mentioned UL grants or for receiving UL transmissions. Further, the interface 1010 may be utilized sending the above-mentioned control information to the communication devices and/or for receiving control information from the communication devices. If the access node is implemented as a base station, such as the eNB 100, the interface 1010 may be a radio interface for establishing radio links to the communication devices. If the node is implemented as a control node of a base station, such as an RNC of the UMTS radio access technology, the interface 1010 may be used for controlling the base station and for sending or receiving transmissions of the communication devices via the base station.

Further, the node includes one or more processors 1050 coupled to the interface 1010, and a memory 1060 coupled to the processor(s) 1050. The memory 1060 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1060 includes suitably configured program code to be executed by the processor(s) 1050 so as to implement the above-described functionalities of the communication device. In particular, the memory 1060 may include various program code modules for causing the node to perform processes as described above, e.g., corresponding to the method steps of FIG. 8. As illustrated, the memory 1060 may include a IUA control module 1070 for implementing the above-described functionalities of determining a UL grant allocating UL resources in reoccurring time intervals and controlling the utilization of such UL grant by monitoring the configured UL radio resource for the TX intent indication and triggering operations depending on whether the TX intent indication is received or not. Further, the memory 1060 may include a dynamic scheduling module 1080 for implementing the above-described functionalities of dynamically sending UL grants with respect to a certain time interval. Further, the memory 1060 may include a control module 1090 for implementing generic control functionalities, e.g., controlling reporting or other signaling, such as detecting failed of transmissions and requesting retransmissions, e.g., as part of a HARQ process.

It is to be understood that the structures as illustrated in FIG. 10 are merely schematic and that the access node may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of an eNB or RNC. According to some embodiments, also a computer program may be provided for implementing functionalities of the access node, e.g., in the form of a physical medium storing the program code and/or other data to be stored in the memory 1060 or by making the program code available for download or by streaming.

Figure 11:
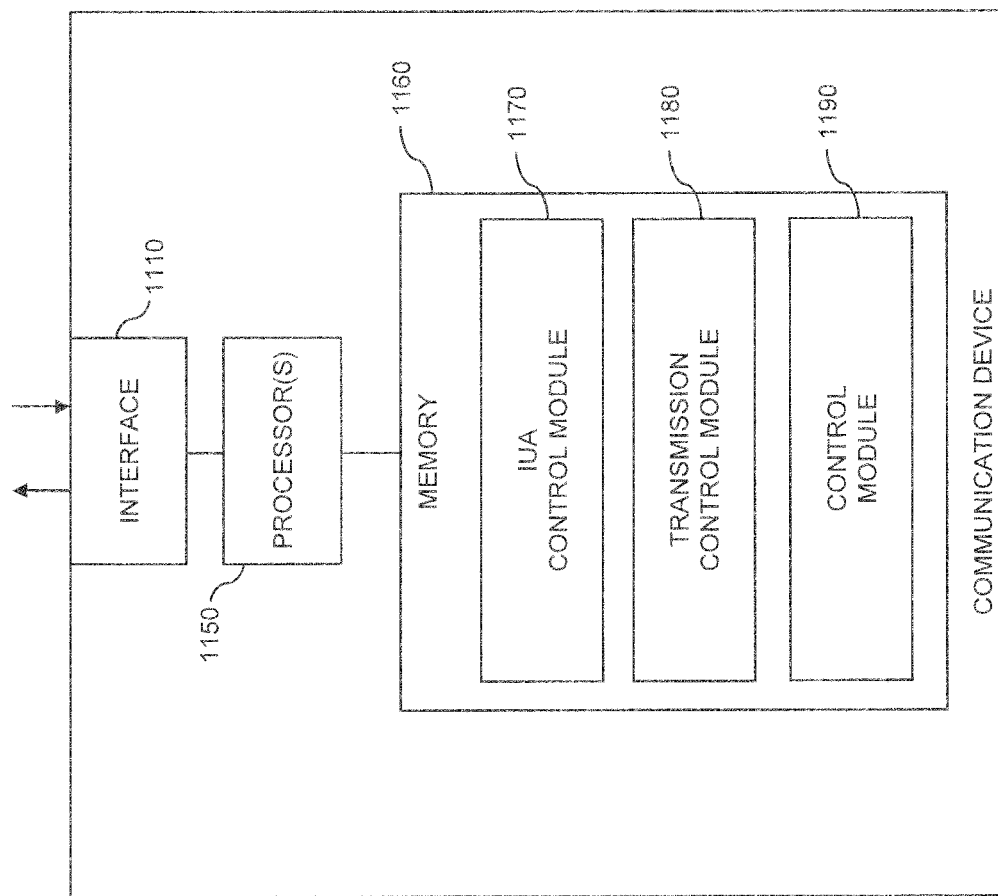
FIG. 11 schematically illustrates structures of a communication device according to an embodiment of the invention.

FIG. 11 illustrates exemplary structures which may be used for implementing the above concepts in a communication device, e.g., the UE 10-A, 10-B, or 10-C.

As illustrated, the communication device may include an interface 1110 for connecting to a cellular network. For example, the interface may correspond to a radio interface as specified for the LTE radio access technology or based on another radio access technology, such as the UMTS radio access technology. The interface 1110 may be utilized for receiving the above-mentioned UL grants or for sending UL transmissions. Further, the interface 1010 may be utilized for sending the above mentioned TX intent indication. Further, the interface 1010 may be utilized for receiving the above-mentioned control information from the cellular network or sending control information to the cellular network.

Further, the communication device includes one or more processors 1150 coupled to the interface 1110, and a memory 1160 coupled to the processor(s) 1150. The memory 1160 may include a ROM, e.g., a flash ROM, a RAM, e.g., a DRAM or SRAM, a mass storage, e.g., a hard disk or solid state disk, or the like. The memory 1160 includes suitably configured program code to be executed by the processor(s) 1150 so as to implement the above-described functionalities of the communication device. In particular, the memory 1160 may include various program code modules for causing the communication device to perform processes as described above, e.g., corresponding to the method steps of FIG. 9. As illustrated, the memory 1160 may include a IUA control module 1170 for implementing the above-described functionalities of conditionally utilizing the UL radio resources allocated in reoccurring time intervals and for sending the TX intent indication. Further, the memory 1160 may include a transmission control module 1180 for implementing the above-described functionalities of controlling the sending of UL transmissions from the communication device, e.g., on the UL radio resources in the reoccurring time intervals. Further, the memory 1060 may include a control module 1190 for implementing generic control functionalities such as controlling reporting or other signaling, or controlling retransmissions, e.g., as part of a HARQ process.

It is to be understood that the structures as illustrated in FIG. 11 are merely schematic and that the communication device may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 1060 or by making the program code available for download or by streaming.

As can be seen, the concepts as described above may be used for achieving a low latency for UL transmissions by a communication device while at the same time maintaining efficient utilization of radio resources.

It is to be understood that the examples and embodiments as explained above are merely illustrative and susceptible to various modifications. For example, the TX intent indication as explained for the IUA-UL grant may also be applied in connection with various other types of long lasting grants, e.g., SPS grants. Also, the TX intent indication could be utilized for other purposes than triggering reallocation of the UL radio resources. Further, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

The invention claimed is:

1. A method of controlling radio transmission in a cellular network, the method comprising:
   an access node of the cellular network sending an uplink grant to a communication device, the uplink grant indicating uplink radio resources allocated to the communication device in reoccurring time intervals;
   the access node monitoring an uplink radio resource, configured before each of the reoccurring time intervals, for an indication of intention to transmit uplink data by an uplink transmission on the indicated uplink radio resources in the corresponding reoccurring time interval; and
   in response to not detecting the indication and determining a need for an uplink transmission in the corresponding reoccurring time interval by a further communication device, the access node reallocating the indicated uplink radio resources in the corresponding time interval to the further communication device.

2. The method of claim 1, further comprising the access node selecting, depending on detection of the indication, between a first mode in which monitoring of the indicated uplink radio resources in the corresponding reoccurring time interval by the access node is active and a second mode in which monitoring of the indicated uplink radio resources in the corresponding reoccurring time interval by the access node is inactive.

3. The method of claim 2, further comprising the access node selecting the second mode in response to not detecting the indication.

4. The method of claim 2, further comprising the access node selecting the first mode in response to detecting the indication.

5. The method of claim 1, wherein:
   the indicated uplink radio resources are allocated to a group of multiple communication devices; and
   the configured uplink radio resource is shared by the communication devices of the group.

6. The method of claim 5, further comprising the access node estimating, based on a received signal strength in the configured uplink radio resource, a number of communication devices with intention to perform an uplink transmission on the indicated radio resources in the corresponding reoccurring time interval.

7. The method of claim 6, further comprising the access node, in response to estimated number of communication devices being larger than one, allocating new uplink radio resources in the corresponding reoccurring time interval to at least one of the communication devices of the group.

8. A method of controlling radio transmission in a cellular network, the method comprising:
   a communication device receiving an uplink grant from the cellular network, the uplink grant indicating uplink radio resources allocated to the communication device in reoccurring time intervals;
   in an uplink radio resource configured before each of the reoccurring time intervals, the communication device sending an indication of intention to transmit uplink data by an uplink transmission on the indicated uplink radio resources in the corresponding reoccurring time interval; and
   after sending the indication, the communication device performing the uplink transmission on the indicated uplink radio resources in the corresponding reoccurring time interval.

9. The method of claim 8, wherein:
   the indicated uplink radio resources are allocated to a group of multiple communication devices; and
   the configured uplink radio resource is shared by the communication devices of the group.

10. The method of claim 8 further comprising the communication device selecting, for each of the reoccurring time intervals, between:
    an active mode in which the communication device performs an uplink transmission on the indicated uplink radio resources; and
    an inactive mode in which the communication device performs no uplink transmission on the indicated uplink radio resources.

11. The method of claim 10, further comprising the communication device:
    for each of the reoccurring time intervals, checking whether one or more conditions for sending a buffer status report are met; and
    in response to one or more of the conditions being met, selecting the active mode to send an uplink transmission comprising the buffer status report, the buffer status report indicating an amount of uplink data available for transmission by the communication device.

12. An access node for a cellular network, the node comprising:
an interface for connecting to a communication device; and
processing circuitry configured to:
send an uplink grant to the communication device via the interface, the uplink grant indicating uplink radio resources allocated to the communication device in reoccurring time intervals;
monitor an uplink radio resource, configured before each of the reoccurring time intervals, for an indication of intention to transmit uplink data by an uplink transmission on the indicated uplink radio resources in the corresponding reoccurring time interval; and
in response to not detecting the indication and determining a need for an uplink transmission in the corresponding reoccurring time interval by a further communication device, reallocate the indicated uplink radio resources in the corresponding reoccurring time interval to the further communication device.

13. The access node of claim 12, wherein the processing circuitry is configured to select, depending on detection of the indication, between a first mode in which monitoring of the indicated uplink radio resources in the corresponding reoccurring time interval by the access node is active and a second mode in which monitoring of the indicated uplink radio resources in the corresponding reoccurring time interval by the access node is inactive.

14. The access node of claim 13, wherein the processing circuitry is configured to select the second mode in response to not detecting the indication.

15. The access node of claim 13, wherein the processing circuitry is configured to select the first mode in response to detecting the indication.

16. The access node of claim 12, wherein:
the indicated uplink radio resources are allocated to a group of multiple communication devices;
the configured uplink radio resource is shared by the communication devices of the group; and
the processing circuitry is configured to estimate, based on a received signal strength in the configured uplink radio resource, a number of communication devices with intention to perform an uplink transmission on the indicated radio resources in the corresponding reoccurring time interval.

17. The access node of claim 16, wherein the processing circuitry is configured to allocate, in response to estimated number of communication devices being larger than one, new uplink radio resources in the corresponding reoccurring time interval to at least one of the communication devices of the group.

18. A communication device, comprising:
an interface for connecting to a cellular network; and
processing circuitry configured to:
receive, via the interface, an uplink grant from the cellular network, the uplink grant indicating uplink radio resources allocated to the communication device in reoccurring time intervals;
in an uplink radio resource configured before each of the reoccurring time intervals, send an indication of intention to transmit uplink data by an uplink transmission on the indicated uplink radio resources in the corresponding reoccurring time interval; and
after sending the indication, perform the uplink transmission on the indicated uplink radio resources in the corresponding reoccurring time interval.

19. The communication device of claim 18, wherein:
the indicated uplink radio resources are allocated to a group of multiple communication devices, and
the configured uplink radio resource is shared by the communication devices of the group.

20. The communication device of claim 18, wherein the processing circuitry is configured to select, for each of the reoccurring time intervals, between:
an active mode in which the communication device performs an uplink transmission on the indicated uplink radio resources; and
an inactive mode in which the communication device performs no uplink transmission on the indicated uplink radio resources.

* * * * *